United States Patent [19]
Fujiwara

[11] Patent Number: 5,151,923
[45] Date of Patent: Sep. 29, 1992

[54] VOICE FREQUENCY COMMUNICATION APPARATUS

[75] Inventor: Genichi Fujiwara, Hyogo, Japan

[73] Assignee: Mitsubishi Denki Kabushiki Kaisha, Tokyo, Japan

[21] Appl. No.: 371,822

[22] Filed: Jun. 27, 1989

[30] Foreign Application Priority Data

Jun. 28, 1988 [JP] Japan .................................. 63-157947
May 24, 1989 [JP] Japan .................................. 1-128870

[51] Int. Cl.⁵ .......................... H04B 1/38; H04B 1/46
[52] U.S. Cl. .......................................... 375/5; 375/7; 370/24; 370/110.1; 379/97; 455/79
[58] Field of Search ................. 375/5, 7, 8, 9; 370/24, 370/110.1, 111; 379/93, 97, 98; 455/79

[56] References Cited

U.S. PATENT DOCUMENTS

| | | | |
|---|---|---|---|
| 3,592,962 | 7/1971 | Matthews | 379/97 |
| 4,143,242 | 3/1979 | Horiki | 370/110.1 |
| 4,377,860 | 3/1983 | Godbole | 375/5 |
| 4,667,319 | 5/1987 | Chum | 370/55 |

FOREIGN PATENT DOCUMENTS 38-1238  1/1963  Japan .

Primary Examiner—Benedict V. Safourek
Assistant Examiner—Young Tse

[57] ABSTRACT

A voice frequency communication apparatus which is capable of detecting and processing the voice frequency terminal signal and non-voice frequency terminal signal and is also capable of realizing communication with ordinary voice frequency terminal signal and non-voice frequency terminal signal without erroneous change-over of the signal processing path because of always monitoring the sending/receiving data with CPU because of providing the constitution to always monitor the sending/receiving data by providing a central control circuit (CPU) having the constitution to always monitor the digital signal output of the detection circuit having the fuction to convert, when the analog input signal is non-voice frequency terminal signal, such non-voice frequency terminal signal into the digital data signal after detecting such signal and to convert, on the contrary, the digital data signal into the analog non-voice frequency terminal signal and the digital data signal to be input from the digital communication line through the communication line I/F circuit and also monitoring such signals.

16 Claims, 9 Drawing Sheets

VOICE FREQUENCY COMMUNICATION APPARATUS

BACKGROUND OF THE INVENTION

1. Field of the Invention

The present invention relates to a voice frequency communication apparatus which applies a voice frequency digital communication system utilizing a low bit rate encoding signal having the transmission rate, for example, of 16 kbps or 9.6 kbps, to the facsimile communication and communication through personal computer.

2. Description of the Prior Art

FIG. 1 is a block diagram of a voice frequency communication apparatus for digital low bit rate transmission which is capable of transmitting a voice frequency terminal signal/non-voice frequency terminal signal of the prior art disclosed, for example, in the Japanese Patent Publication No. 63-1238 (1988) filed to the Patent Office in Japan. In the same figure, the reference numeral 1 designates a voice frequency input/output I/F circuit as an interface circuit for input and output of an analog voice frequency signal in the frequency bandwidth of 300–3400 Hz; 2, an A/D converter for converting the analog voice frequency signal from this voice frequency input/output I/F circuit 1 into the digital signal having the transmission quality equal to or higher than that in the PCM (Pulse Code Modulation) encoding system by $\mu$-law ($\mu=255$); 3, a D/A converter for converting a digital signal to an analog signal by the decoding system which is equivalent to the A/D converter 2; 4, a 9.6 kbps/16 kbps encoder (hereinafter referred only to as encoder) as a data conversion circuit which compresses the digital signal from the A/D converter 2 into the digital data signal of 9.6 kbps or 16 kbps; 5, a 9.6 kbps/16 kbps decoder (hereinafter referred only to as decoder) as a data conversion circuit for expanding the 9.6 kbps or 16 kbps digital data signal to the digital signal which is more redundant than 16 kbps by the data conversion system which is identical to the encoder 4; 6, a communication line I/F circuit as an interface circuit between a digital communication line (CL) and the present apparatus; 14, a data selector for selecting the signal path with the voice frequency terminal signal and non-voice frequency terminal signal; 36, a demodulator for non-voice frequency terminal; 37, a modulator; 38, a frame forming circuit; 39, a frame separation circuit; 40, an analog switch for switching the signal path with the voice frequency terminal signal and non-voice frequency terminal signal; 41, a non-voice frequency terminal distinguishing circuit for controlling the data selector 14 and the analog switch 40.

Next, operations will be explained In FIG. 1, the signal from the voice frequency terminal is detected as a detection output in the level "0" by the non-voice frequency terminal distinguishing circuit 41 and the data selector 14 and analog switch 40 do not operate and are kept in the connecting condition indicated in the figure. Therefore, the sending signal from the voice-frequency terminal is encoded into a PCM code by the A/D converter 2 and is then compressed by the encoder 4 and is transmitted to the digital communication line through the communication line I/F circuit 6. The receiving digital data signal from the digital communication line is expanded by the decoder 5 through the communication line I/F circuit 6, decoded to the initial voice frequency by the D/A converter and is then supplied to the terminal as the receiving output signal.

Meanwhile, a call is terminated from the non-voice frequency terminal, an identifying signal which has a constant frequency and continues for a certain period is detected by the non-voice frequency terminal distinguishing circuit 41 consisting of a band-pass-filter and a detector and the detected output changes over two data selectors 14 and two analog switches 40. As a result, the transmitting signal from the non-voice frequency terminal is demodulated to the original digital code by the decoder 36, a control bit and a frame bit are added in the frame forming circuit 38 to such transmitting signal, and finally this transmitting signal is sent through matching of transmission rate with the digital communication line. As an example, when a voice frequency encoding speed and digital transmission path speed are set to 16 kbps and data encoding speed from the non-voice frequency terminal is set to 9.6 kbps, matching of speed can be realized by adding total of 4 bits combining the control bit and frame synchronization bit to the data code of 6 bits and then transmitting the signal in the frame format that a frame is formed by 10 bits. Moreover, the digital data signal from the digital communication line enters a frame separation circuit 39 through the communication line I/F circuit 6 and separates the data code and control bit. This signal then enters the modulator 37 to become the analog modulated signal through modulation of the carrier and then sent to the non-voice frequency terminal as the receiving output signal. Operations of the data selector 14 and analog switch 40 are held during transmission of data from the non-voice frequency terminal but are recovered when the communication terminates and the transit line is set free.

A voice frequency communication apparatus which is capable of transmitting the conventional voice frequency terminal signal and non-voice frequence terminal signal is thus constituted as described above. Therefore, it has a problem that when the signal including the frequency component detected by the non-voice frequency signal distinguishing circuit 41, although it may be the signal from the voice frequency terminal, is input for a constant period, the apparatus erroneously recognizes such signal as the signal from the non-voice frequency terminal and changes the signal path to the line for processing non-voice frequency terminal signal utilizing the demodulator and modulator and thereby such voice-frequency terminal signal cannot be transmitted correctly.

Moreover, when the signal such as the modem signal conforming to the CCITT recommendation V.29, which shows a higher bit error rate through the encoder and decoder of the voice frequency communication apparatus, is input, for example, this modem signal of V.29 is output to the digital communication line in the route passing through the encoder and is also input to the non-voice frequency terminal distinguishing circuit as the analog signal. Accordingly, when the detection frequency of the distinguishing circuit is equal to the carrier frequency of the modem signal defined in V.29, the non-voice frequency distinguishing circuit operates, after a predetermined period, the analog switch and data selector in order to change the signal path to the line for processing non-voice frequency terminal utilizing the demodulator and modulator Accordingly, the modem signal of V.29 is processed by the demodulator and frame forming circuit and thereafter output to the digital communication line. Meanwhile, the voice frequency communication apparatus in the receiving side provided opposed to the sending side receives first, as is obvious from operation of the voice frequency communication apparatus in the sending side, the signal obtained by processing the modem signal of V.29 with the encoder, as the data A, from the digital communication line. Moreover, after a predetermined period, it receives the signal processed by the demodulator and frame forming circuit as the data B. As a result, the data A received first by the voice frequency communication apparatus in the receiving side is the D/A converted analog signal expanded by the decoder and this signal is then input to the non-voice frequency terminal distinguishing circuit However, the data B received by the voice frequency communication apparatus in the receiving side after a constant period is identical to a distorted signal including a high bit error rate obtained by encoding and then decoding the modem signal of V.29. In addition, the non-voice frequency terminal distinguishing circuit sometimes cannot detect the carrier frequency of modem signal of V.29 or takes a longer period for detection of such modem signal. Moreover, since changeover is not carried out for the signal processing path until the detection is continued for a predetermined period even after the data A is once detected, if reception of data B is started before passage of such detection period, the data B is processed by the decoder and the output thereof becomes abnormal coded output. The analog signal obtained by D/A conversion of such abnormal signal naturally has abnormal waveform. Accordingly, if it is input to the non-voice frequency terminal distinguishing circuit, this circuit does not decide the input signal as the non-voice frequency terminal signal and the signal processing path is not changed over. Therefore, a problem arises herein, namely the signal processing path is different in the apparatus of the sending and receiving sides and thereby non-voice frequency terminal communication is disabled.

In addition, for the facsimile communication, the CCITT recommendation proposes use of the V.21 modem signal (300 bps) or V.27 per modem signal (2400 bps) as the control signal but transmission of modem signal tends to become more difficult as the bit rate of voice frequency encoding system of encoder/decoder becomes lower. In actual, some voice frequency encoding systems of 16 kbps cannot transmit the V.27 per modem signal (2400 bps). When the bit rate of voice frequency encoding system is further lowered, it may be forecasted that only transmission of the V.21 modem signal (300 bps) becomes difficult. With the process similar to that explained with an example of the V.29 modem signal described above, the facsimile communication conceives a problem that not only a message signal but also a control signal cannot be transmitted.

Meanwhile the voice frequency communication apparatus of the prior art indicated above refers, for operations of data selector and analog switch within the apparatus, only to "that operations are held during communication of non-voice frequency terminal but is restored when communication terminates and the transit line is set free" and does not explain at all how detects the "communicating condition" and "termination of communication", and therefore the voice frequency terminal signal/non-voice frequency terminal signal cannot be transmitted in actual through the digital communication line with the same low bit rate if such detection is unclear.

SUMMARY OF THE INVENTION

It is an object of the present invention to provide a voice frequency communication apparatus which reliably realizes not only the communication as a telephone set but also high speed data communication as a facsimile apparatus.

It is another object of the present invention to provide a voice frequency communication apparatus which reliably and automatically changes the signal path by deciding that the signal transmitted is a voice frequency terminal signal or non-voice frequency terminal signal.

It is further object of the present invention to provide a voice frequency communication apparatus which reliably realizes transmission and reception of signal in the low bit rate voice frequency encoding system.

Aforementioned and further objects and novel features of the present invention will be understood by thoroughly reading the detailed description thereof with reference to the accompanying drawings which, however, are given only for convenience of description and do not limit the scope of the invention.

In order to attain the objects described above, the 9.6 kbps/16 kbps voice frequency communication apparatus converts an analog signal of voice frequency bandwidth (300–3400 Hz) to a digital signal through an A/D converter, compresses such digital signal into the signal of predetermined transmission rate with a data conversion circuit to output such signal to the communication line through the communication line I/F circuit, expands the digital signal of the predetermined transmission rate input through the communication line I/F circuit from the communication line to convert the signal into the analog signal of the voice frequency bandwidth through the D/A converter and then outputs the analog signal to the transmission line. This voice frequency communication apparatus provides a constitution to always monitor the digital signal output of the detection circuit having the function to detect the signal, in case the analog signal is the non-voice frequency terminal signal, and then convert such non-voice frequency terminal signal into the digital data signal and also converts, on the contrary, the digital data signal into the analog non-voice frequency terminal signal and the digital data signal to be input from the communication line I/F circuit from the digital communication line and also provides a central control circuit or central processing unit (CPU) to monitor the signals.

Accordingly, the voice frequency communication apparatus of the present invention confirms, since it always monitors the digital data signal output from the detection circuit with the CPU, whether the analog signal as the transmitting signal input to the voice frequency communication apparatus is the non-voice frequency terminal signal which may be converted to the digital signal by the detection circuit or the voice frequency terminal signal which may not be converted by the detection circuit or the non-voice frequency terminal signal which may be converted into the digital data signal by the detection circuit and may be communicated with the encoder/decoder, changes over the data selector, if necessary, upon judgement whether the signal processing path must be changed over to the path using the detection circuit and CPU from the path using the encoder/decoder or not. In addition, since the CPU always monitors the digital data signal from the digital communication line through the communication line I/F circuit, the voice frequency communication apparatus confirms whether the data received has been processed by the encoder or by the detection circuit and CPU and also changes over the data selector, if necessary, upon judgement whether changeover of the signal processing path is necessary or not as described previously.

In more concrete, for the facsimile communication, it is possible to employ the method that the signal processing path is held to the path (path B) utilizing the detection circuit and CPU when CPU of the voice frequency communication apparatus finds DIS (Digital Identification Signal) of CCITT Recommendation T.30 or the preamble thereof and thereafter the path is changed over to the path (path A) utilizing the encoder/decoder when CPU finds DCN (Disconnect).

When considering the non-voice frequency terminal communication in a broad sense, the voice frequency communication apparatus in the sending side which directly receives the sending signal at the non-voice frequency terminal is capable of deciding data content of the sending signal with CPU in regard to the timing for changing the path. Therefore, the CPU of voice frequency communication apparatus in the sending side is able to send the particular signal for informing changing of the signal processing path to the path B of the CPU in the voice frequency communication apparatus in the receiving side before sending the sending data to the digital communication line. Here, it is preferential to give, for example, the information such as transmission rate of modem and specifications to this signal. Moreover, the particular signal to sending the data indicating the end of sending data, namely transfer of signal processing path to the path A to the CPU of voice frequency communication apparatus in the receiving side can also be transmitted.

In case the path B is used for matching between the transmission rate of modem and that of digital communication line in above explanation, the data output to the digital communication line includes the data added artificially.

DETAILED DESCRIPTION OF THE PREFERRED EMBODIMENTS

The preferred embodiment of the present invention will be explained in detail with reference to the accompanying drawings.

Figure 1:
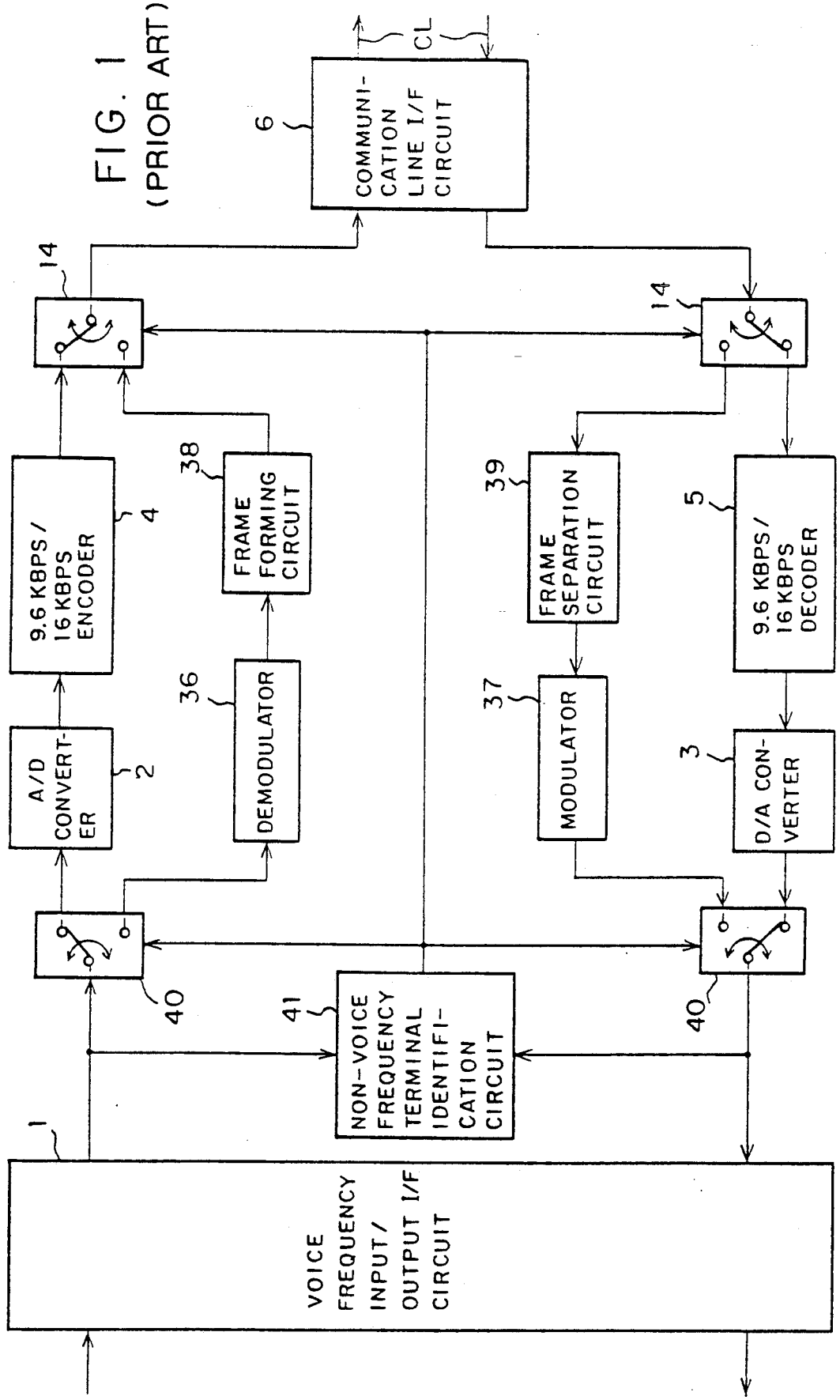
FIG. 1 is a block a diagram of a voice frequency communication apparatus of the prior art.
Figure 2:
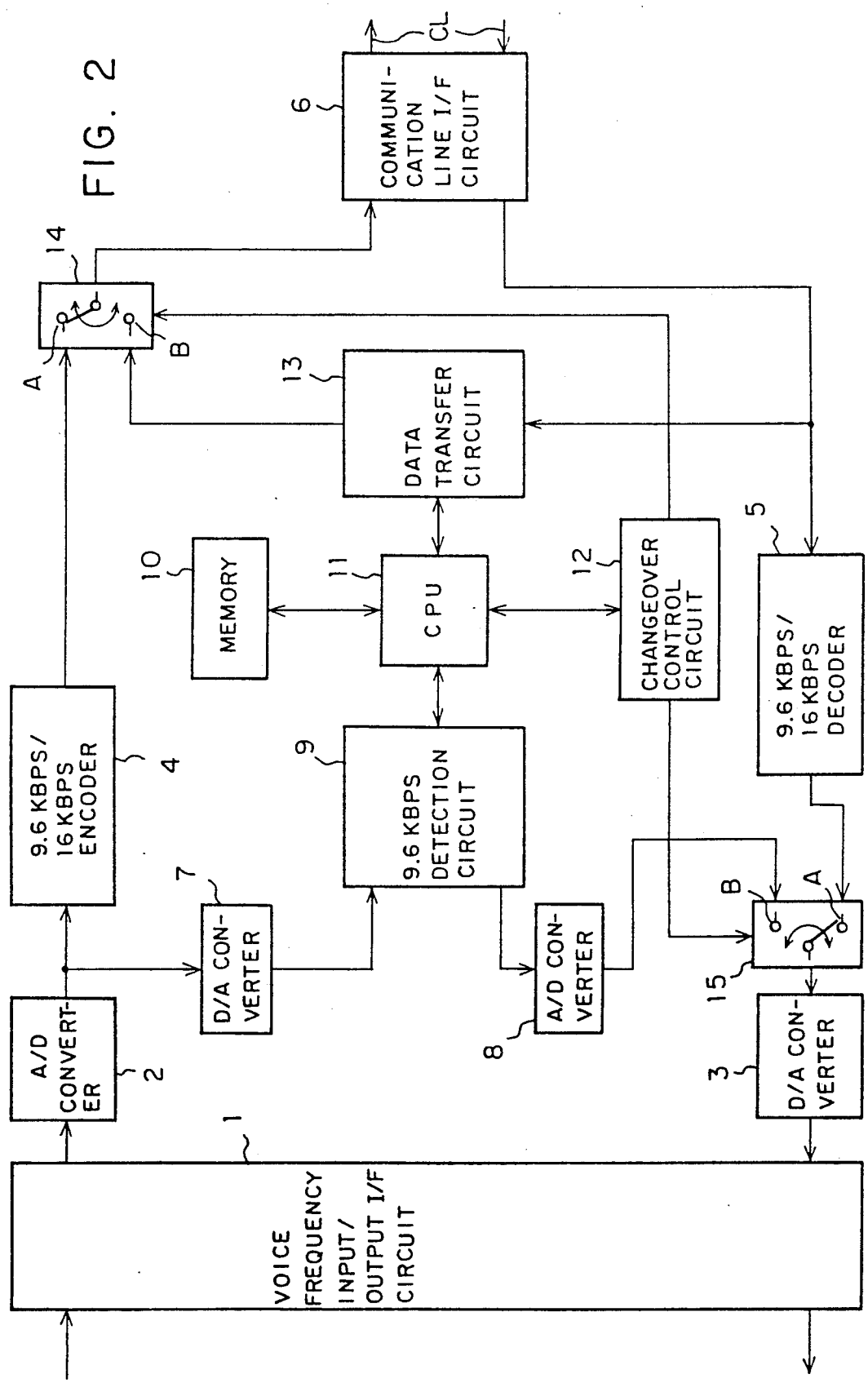
FIG. 2 is a block diagram of a voice frequency communication apparatus as a first embodiment of the present invention.

FIG. 2 is a block diagram of the voice frequency communication apparatus as the first embodiment of the present invention. In the same figure, the reference numerals 1 to 6 designate the elements same as those of the prior art apparatus and therefore these are not explained here. The reference numeral 7 designates a D/A converter having the same function as the D/A converter 3; 8, an A/D converter having the same function as the A/D converter 2; 9, a 9.6 kbps detection circuit (hereinafter referred only to as detector) for detecting whether the signal input to the voice frequency communication apparatus is the voice frequency terminal signal or the non-voice frequency terminal signal such as the facsimile signal; 10, a memory as a system memory; 11, a central control circuit (hereinafter only referred to as CPU) for controlling all circuits shown in the figure; 12, a changeover control circuit for changing over the first data selector 14 and the second data selector 15; 13, a data transfer circuit for transferring data between the communication line I/F circuit 6 and CPU 11.

The first data selector 14 and second data selector 15 respectively have a couple of changeover contacts A, B as shown in the figure.

Figure 3:
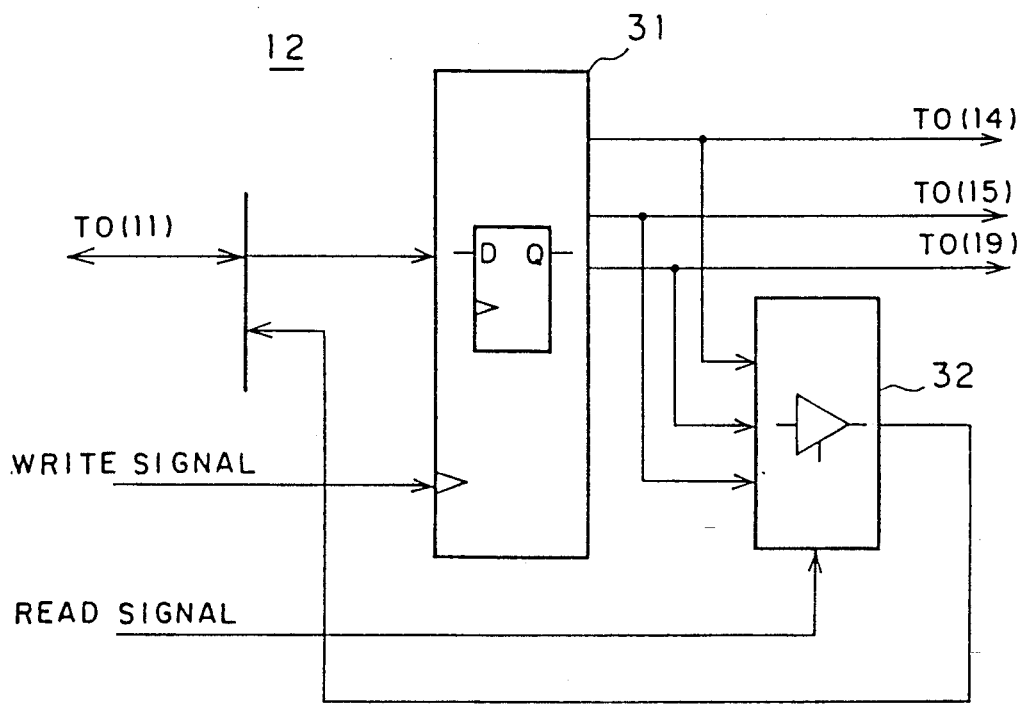
FIG. 3 is a block diagram of a changeover control circuit in the block diagram shown in FIG. 2.

FIG. 3 is a block diagram of a practical constitution of the changeover control circuit 12. In this figure, the reference numeral 31 designates a data latch; and 32, tristate buffer.

Figure 4:
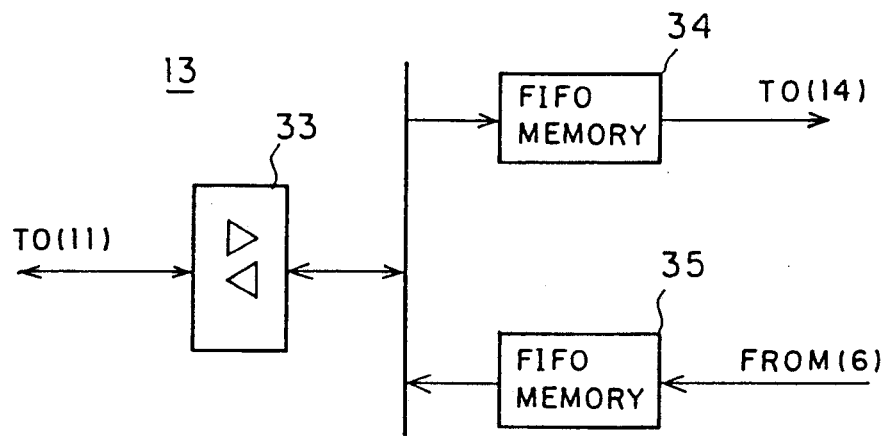
FIG. 4 is a block diagram of a transfer circuit in the block diagram shown in FIG. 2.

FIG. 4 is a block diagram of a practical constitution of the data transfer circuit 13 described above. In this figure, the reference numeral 33 designates a bus transceiver; 34, 35, a memory having the FIFO (first-in first-out) function.

Next, operations will be explained hereunder. In case the V.29 modem signal, for example, is sent to the voice frequency communication apparatus from the facsimile apparatus, such non-voice frequency terminal signal is input from the modem not illustrated and is then applied to the voice input/output I/F circuit 1. Accordingly, this voice frequency input/output I/F circuit 1 converts such input data signal to the level within the range for processing by the A/D converter 2 and applies the analog non-voice frequency terminal signal to the A/D converter 2. Thereby, the A/D converter 2 outputs the digital signal of the input analog non-voice frequency terminal signal. This digital data signal is then converted again into the initial analog non-voice frequency terminal signal by the D/A converter 7 and is then applied to the detection circuit 9.

Therefore, the detection circuit 9 detects that the signal input to the apparatus is not the voice frequency terminal signal but the non-voice frequency terminal signal (V.29 modem signal) and gives the detection result to CPU 11. Thereby, CPU 11 gives a command to the changeover control circuit 12 to change over the contact A of the data selector 14 to the contact B. Namely, the signal line connecting the circuits 1, 2, 4, 14, 6 (signal line for using the apparatus as a telephone set) is changed over to the signal line connecting the circuits 1, 2, 7, 9, 11, 13, 14, 6 (signal line for using the apparatus as the data communication apparatus).

Accordingly, after this changeover operation, the detection circuit 9 converts the non-voice frequency terminal signal sent from the D/A converter 7 to the digital signal with the bit rate of 9.6 kbps and executes the operation to give the signal to CPU 11 while the non-voice signal terminal signal is transmitted. Therefore, CPU 11 converts the digital signal received into the signal in the form conforming to the bit rate of communication line CL and gives the signal to the data transfer circuit 13. If, however, the bit rate of communication line CL is 9.6 kbps, the digital signal received from the detection circuit 9 without any conversion is sent to the data transfer circuit 13. On the other hand, when the bit rate of communication line CL is 16 kbps, an artificial data as much as 6.4 kbps is added, conforming to a certain rule, to the digital signal received from the detection circuit 9 and this signal is applied to the data transfer circuit 13 as the digital signal of 16 kbps. The data transfer circuit 13 transfers the data of digital signal sent from CPU 13 to the communication line I/F circuit 6 via the changeover contact B of the first data selector 14.

As the result, the data is transmitted to the voice frequency communication apparatus in the receiving side via the communication line CL.

Upon completion of data communication described above, the detection circuit 9 detects it and informs it of CPU 11. As the result, CPU 11 gives a command to the changeover control circuit 12. Thereby, the changeover contact of first data selector 14 is changed to A from B, changing over the signal line to the line connecting the circuits 1, 2, 4, 14, 6. Under this condition, operations as the voice frequency communication apparatus are the same as those of the prior art apparatus.

Meanwhile, operations for receiving such data signals transmitted from the voice frequency communication apparatus of the distant side are as follow. The data signal input to the data transfer circuit 13 from the communication line CL through the communication line I/F circuit 6 is transferred to CPU 11 with the bit rate of communication line. In this case, CPU 11 decides whether the input data signal has been processed by the encoder or by the detecting circuit and CPU. In case CPU 11 decides the input data signal to have been processed by the detecting circuit and CPU, it gives a command to the changeover control circuit 12 to change over the changeover contact of the second data selector 15 to B from A. Thereby, the signal line for using the apparatus as the data communication apparatus of the circuits 6, 13, 11, 9, 8, 15, 3, 1 can be set up. Thereafter, while the data signal is transmitted, CPU 11 converts the data signal sent from the data transfer circuit 13 with the bit rate of communication line CL to the data signal of 9.6 kbps and sends this signal to the detection circuit 9. If the bit rate of communication line CL is 9.6 kbps, CPU 11 sends the data received from the data transfer circuit 13 to the detection circuit 9 without any conversion. On the other hand, the bit rate of communication line CL is 16 kbps, the data of 6.4 kbps artificially added is subtracted from the digital data received from the data transfer circuit 13 conforming to the rule for adding the artificial data of 6.4 kbps described above and the remaining data is sent to the detection circuit 9. The detection circuit 9 converts the data signal of 9.6 kbps sent from CPU 11 to the analog non-voice frequency terminal signal. This analog modem signal is then input to the A/D converter 8, second data selector 15, D/A converter 3 and modem via voice frequency input/output I/F circuit 1 and is output to the facsimile apparatus as the data.

Upon completion of data communication, CPU 11 detects it, gives a command to the changeover control circuit 12 to change over the contact of the second data selector 15 to A from B and the signal line to the circuits 6, 5, 15, 3, 1. Here, operations as the voice frequency communication apparatus under this condition are the same as that of the prior art apparatus.

Detail operations in FIG. 3 of the changeover control circuit during such operations are as follow. Namely, the control data from CPU 11 is latched by the data latch 31 and thereby sending the changeover control signal to the data selectors 14, 15. However, the data latch 13 latches data only when the write signal is input to the changeover control circuit 12 from CPU 11. Moreover, the data latched by the data latch 31 is monitored by the tristate buffer 32 and when the read signal from CPU 11 is input to the changeover control circuit 12, the data monitored by the tristate buffer 32 is output to CPU 11. Meanwhile, when the read signal is not input, an output of tristate buffer 32 is set in the high impedance.

Operations of data transfer circuit 13 shown in FIG. 4 will be explained hereunder. The data from CPU 11 is output only to the FIFO memory 34 by the bus transceiver 33. On the other hand, the bus transceiver 33 extracts the data sent from the communication line I/F circuit 6 from the memory 35 of FIFO and outputs it to CPU 11.

Figure 5:
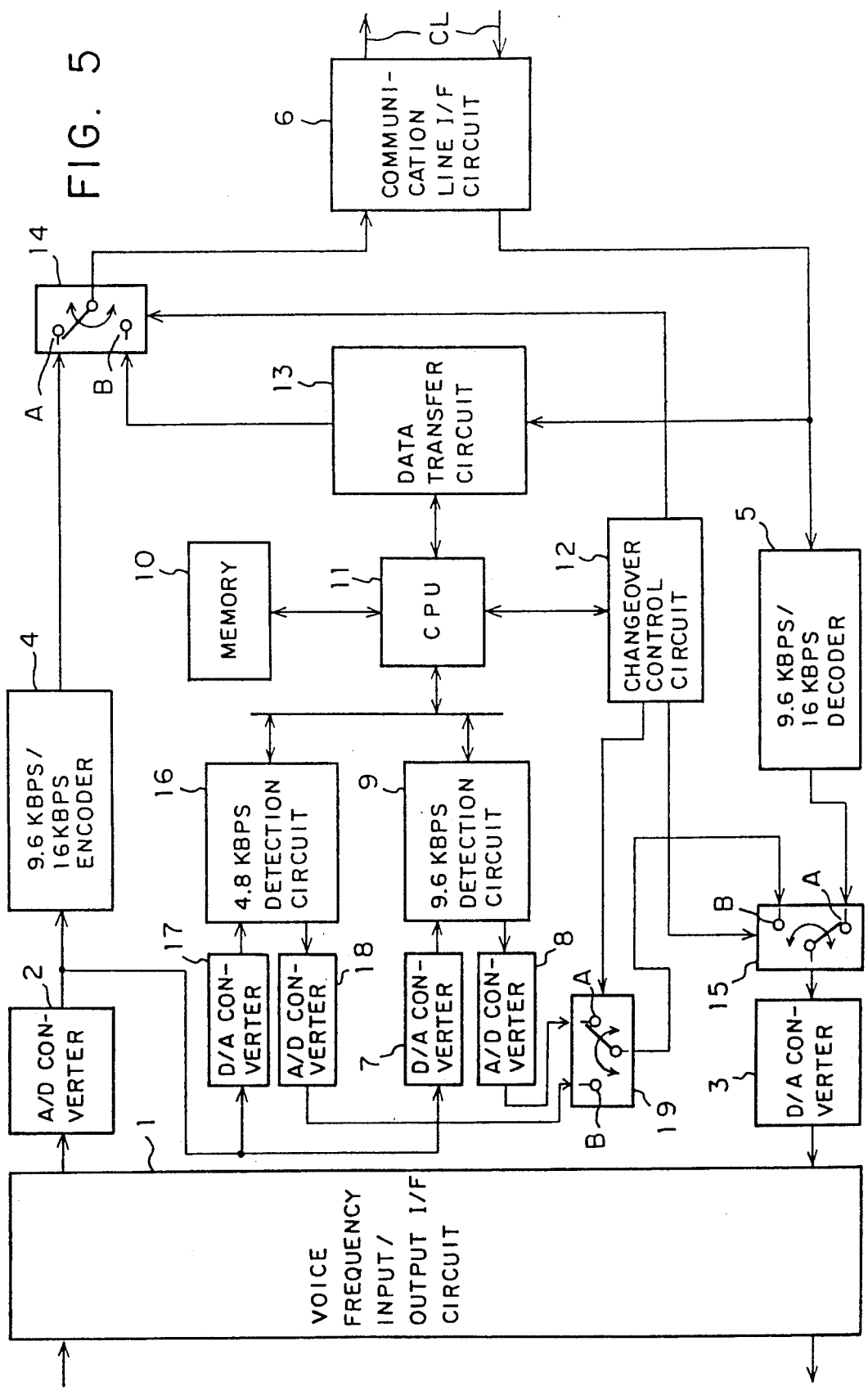
FIG. 5 is a block diagram of a voice frequency communication apparatus as a second embodiment of the present invention.

The second embodiment will be explained with reference to FIG. 5. This embodiment uses the detection circuit for 4.8 kbps for the digital communication with the bit rate of 9.6 kbps or 16 kbps. The function of the 9.6 kbps detection circuit 9 in FIG. 2 for the 9.6 kbps data signal is directly adopted to the 4.8 kbps data signal of the 4.8 kbps detection circuit shown in FIG. 5. Therefore, the D/A converter 17 corresponding to D/A converter 7 and the A/D converter 18 corresponding to A/D converter 8 are respectively provided for the detection circuit 16 described above and a data selector 19 is also provided for selecting an output of the detection circuit 9 or 16. This data selector 19 is subject to changeover control by the changeover control circuit 12.

Next, operations will be explained hereunder. When the data to be transmitted is the 4.8 kbps data signal, the 4.8 kbps detection circuit 15 detects and transfers it to CPU 11. CPU 11 changes output of data selector 19 to the contact B in the side of 4.8 kbps detection circuit 15 through the changeover control circuit 12.

On the other hand, when the 9.6 kbps data signal is input, the 9.6 kbps detection circuit 9 detects it and thereby an output of data selector 19 is changed to the contact A in the side of 9.6 kbps detection circuit 9 as in the case where the 4.8 kbps data signal is input. The other operations are same as those in FIG. 2.

The third embodiment will be explained with reference to FIG. 6. The third embodiment uses the signal obtained by frequency-multiplexing of the 4.8 kbps data signal and 600 bps data signal for the digital communication with the bit rate of 9.6 kbps or 16 kbps. In this case, it should be noted that the carrier frequency of 4.8 kbps data signal is set higher than the carrier frequency of 600 bps data signal and the occupied frequency bandwidths are not overlapped with each other.

Figure 6:
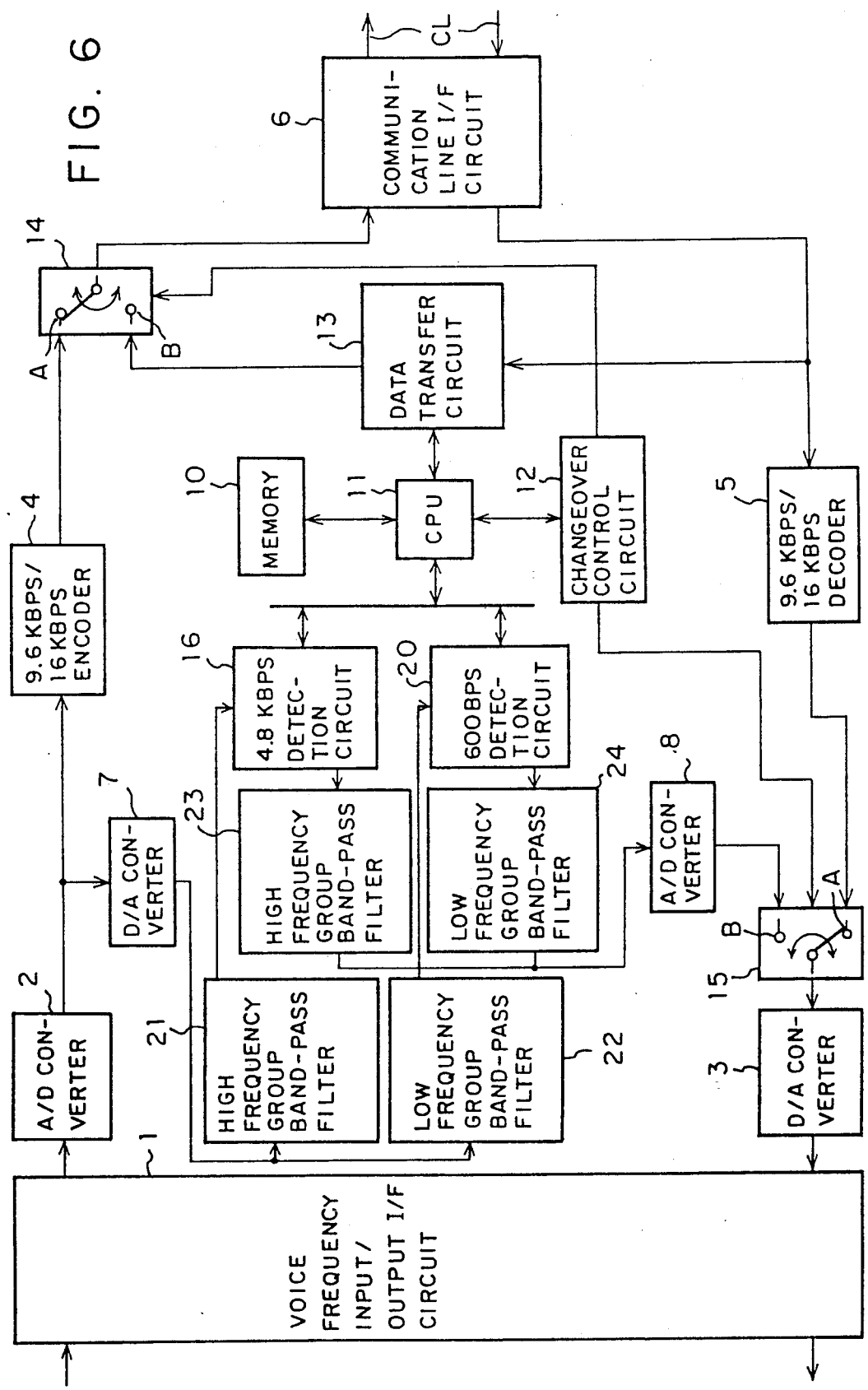
FIG. 6 is a block diagram of a voice frequency communication apparatus as a third embodiment of the present invention.
Figure 7:
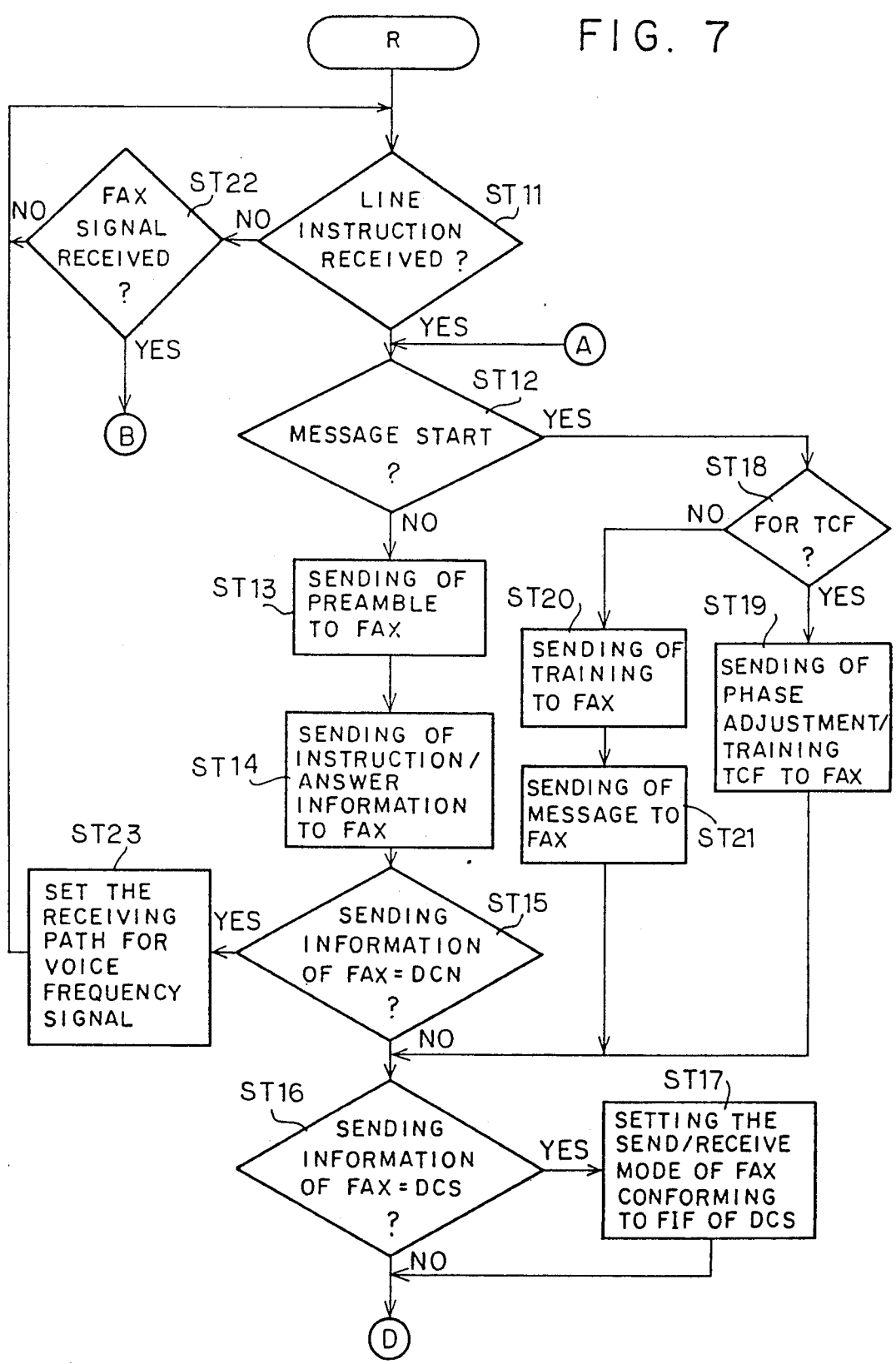
FIG. 7 to FIG. 10 are flowcharts of operations of the voice frequency communication apparatus as the embodiment of the present invention.
Figure 8:
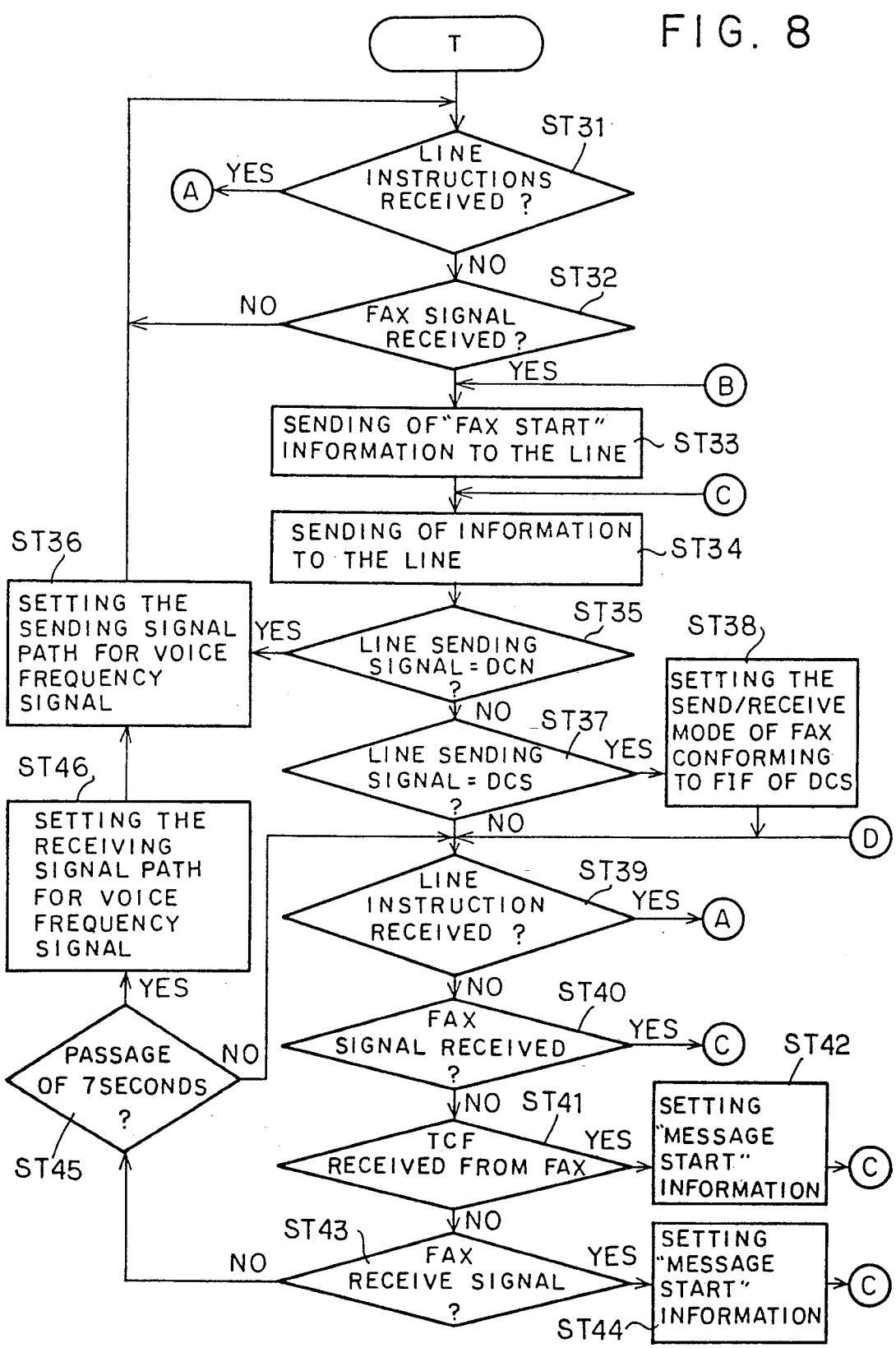

Therefore, as shown in FIG. 6, the 4.8 kbps detection circuit 16, 600 bps detection circuit 20, high frequency group BPFs (band-pass filter) 21, 23 and low frequency group BPFs 22, 24 are provided.

Next, operations will be explained. When a frequency divided multiplex signal is input as the data signal, it is separated to 4.8 kbps data signal and 600 bps data signal by the high frequency group BPF 21 and low frequency group BPF 22 and these signals are respectively input to the 4.8 kbps detection circuit 16 and 600 bps detection circuit 20. The detection circuits 16 and 20 convert the input signals to 4.8 kbps digital data signal and 600 bps digital data signal and transfer these digital signals to CPU 11. CPU 11 time-division multiplexes, in a certain rule, the 4.8 kbps digital data signal, 600 bps digital data signal and artificial data to form the 9.6 kbps or 16 kbps (conforming to the bit rate of communication line CL) data as the data to be sent to the communication line CL.

On the other hand, when the time-division multiplex signal is sent from the distant side as the data signal, the 4.8 kbps digital data signal, 600 bps digital data signal are extracted, based on the rule same as that to generate multiplex data, from such data by CPU 11. CPU 11 then transfers respectively the 4.8 kbps digital data to the 4.8 kbps detection circuit 16 and the 600 bps digital data to the 600 bps detection circuit 20. The detection circuits 16 and 20 convert the digital data signals to the 600 bps data signal and 4.8 kbps data signal and output these signals. The high frequency group BPF 23 extracts the lower side band from the 4.8 kbps data signal among these output signals, while the low frequency group BPF 24 extracts the lower side band from the 600 bps data signal to provide data output through frequency-division multiplexing. Operations of the other sections are the same as those in FIG. 2.

In above explanation, the D/A converter 7 and A/D converter 8 are used but it is certain that the D/A converter 7 and A/D converter 8 may be omitted by giving the function to directly process the digital signals to the 9.6 kbps detection circuit 9 and 4.8 detection circuit 16.

Moreover, it is also natural that the 7.2 kbps data signal may be used for digital communication with bit rate of 8 kbps by using the 8 kbps encoder and 8 kbps decoder in place of the 9.6 kbps/16 kbps encoder 4 and 9.6 kbps/16 kbps decoder 5 and using the 7.2 kbps detection circuit in place of the 9.6 kbps detection circuit 9. As explained above, it is certain that a circuit combining the bit rate of encoder and decoder and the bit rate of detection based on the similar concept may be formed.

In addition, it is also certain to form, for example, a 9.6 kbps/16 kbps voice frequency communication apparatus providing a plurality of detection circuits of different bit rates.

Further, it is also possible to form the functions of detection circuits 9, 16, 20, CPU 11, encoder 4, decoder 5 and changeover control circuit 12 with the digital signal processor in order to realize the present invention by the software processing.

The data speed can be determined freely as well as 9.6 kbps, 16 kbps, 4.8 kbps and 600 bps used in the above embodiments.

The flowcharts shown in FIG. 7–FIG. 10 indicates operation examples for conducting facsimile communication using the voice frequency communication apparatus of the present invention based on the concept mentioned above.

Figure 9:
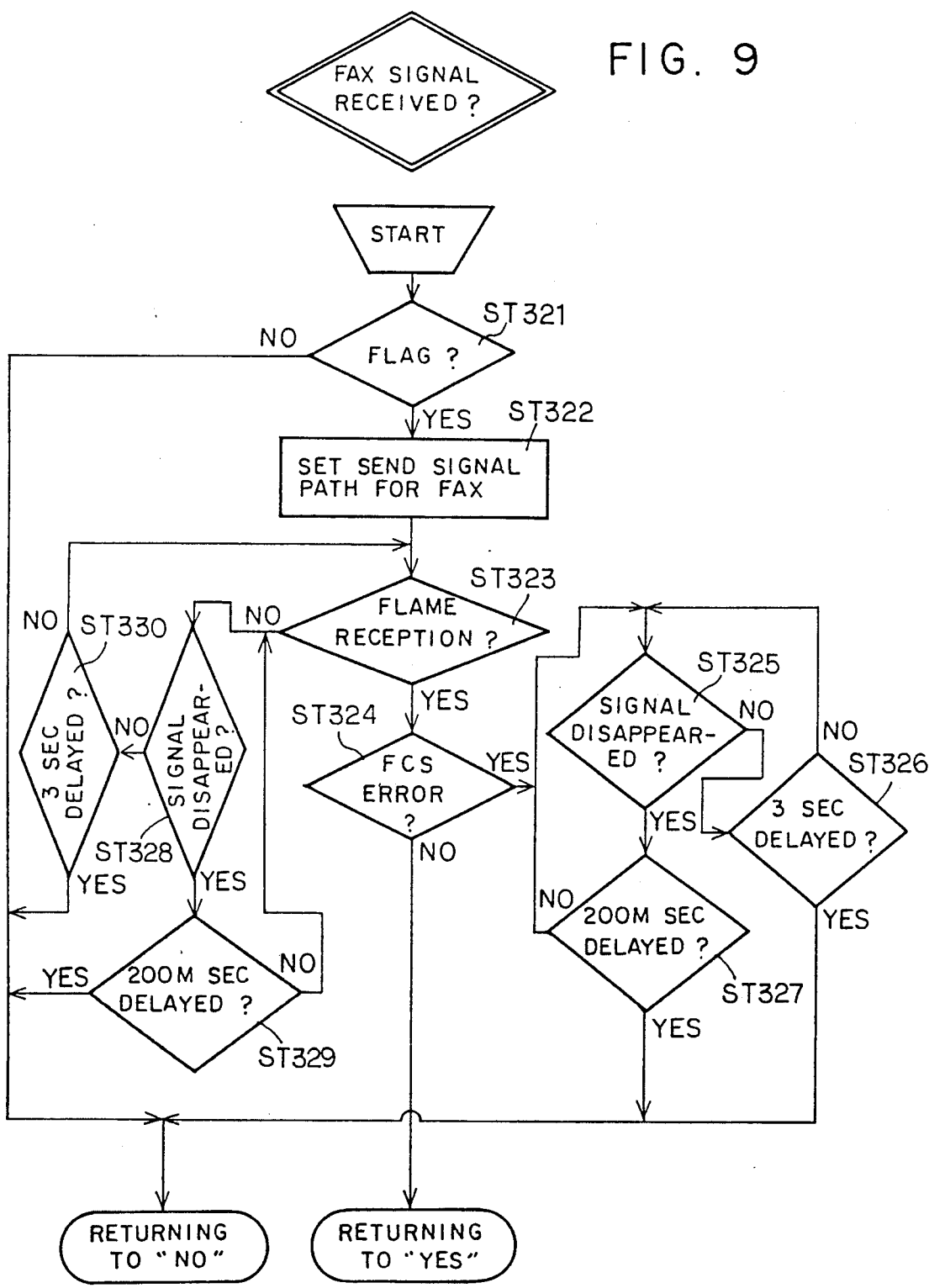
Figure 10:
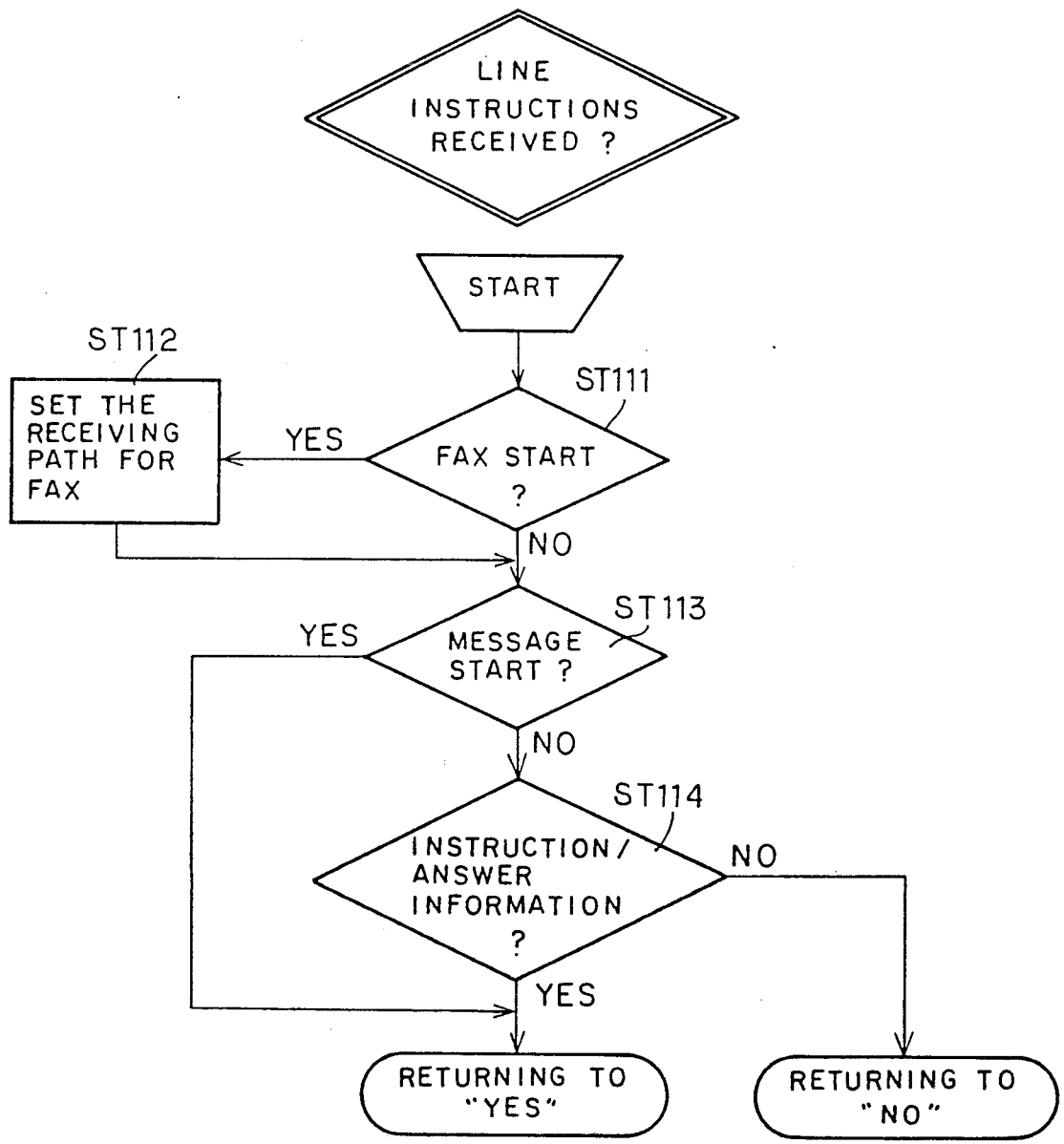

Operations will be explained with reference to such flowcharts. First, it is confirmed whether the instruction signal is received or not from the voice frequency communication apparatus in the side of distant party (step ST11). In this case, the instruction signal is input to CPU 11 through the communication line I/F circuit 6 and data transfer circuit 13 shown in FIG. 2. Moreover, details of processing at the step ST11 are shown in FIG. 10. Since the [FAX START] signal is first appears, CPU 11 having detected this signal instructs the switching control circuit 12 to switch the second data selector 15 to the B side (step ST11). Since message transmission is not started and the instruction signal for facsimile is not received, the conditions of step ST114 are not established and the processing shifts to the step ST22 of FIG. 7. Simultaneously with the processing at the step ST112, termination of call is informed to the facsimile apparatus (FAX) connected with the voice frequency communication apparatus. Thereby, FAX sends the DIS (Digital Identification Signal). This signal is input to CPU 11 through the voice frequency input/output I/F circuit 1, A/D converter 2, D/A converter 7 and detection circuit 9. Therefore, in the step ST22 (details are shown in FIG. 9), CPU 11 detects a flag (step ST321) and instructs the switching control circuit 12 to switch the first data selector 14 to the side B (step ST322). Since the processings of steps ST323–ST330 are same as those recommended by the CCITT recommendation T.30, the explanation is omitted here but when an input of DIS signal without FCS error is input (step ST324), the conditions of step ST22 are established and the processing shifts to the step ST33. Here, the [FAX START] signal is transmitted. This signal is sent to the voice frequency communication apparatus of the distant party and triggers the voice frequency communication apparatus in the distant party to switch the second data selector 15 and to send the information of a type corresponding to the DIS signal input from FAX to the communication line through the data transfer circuit 13, first data selector 14 and communication line I/F circuit 6 (step ST34). The voice frequency communication apparatus in the side of distant party sends the information in accordance with any of DCS or any signal corresponding thereto, and therefore CPU 11 detects this information and the conditions of step ST39 is established (detail processings are shown in FIG. 10 and in this case, conditions of the step ST114 are established). Therefore, processing shifts to the step ST12 but since it does not mean that a message has been received, a preamble and received DCS are sent to FAX (steps ST13, ST14). In this case, these signals are sent to FAX through the detection circuit 9, A/D converter 8, second data selector 15, D/A converter 3 and voice frequency input/output I/F circuit 1 from CPU 11. The bit rate of message is recognized as designated by FIF of DCS. The number of artificial bits is determined by this bit rate. The processing of CPU 11 returns to the step ST39 through the steps ST15, ST16. Since, the voice frequency communication apparatus in the side of distant party sends TCF next, the conditions of step ST39 are established (in this case, the conditions of step ST113 are established in FIG. 9). Here, processing skips to the step ST12. Since the TCF is received, it is then sent to FAX (steps ST12, ST18, ST19). Processing of CPU 11 skips to the step ST40 through the steps ST16, ST39. Since the FAX sends the signal responding to TCF, the conditions of step ST40 are established (details are shown in FIG. 9). Therefore, an information corresponding to the signal responding to TCF is sent, in the step ST34, to the communication line. Processing of CPU 11 shifts to the step ST39 through the steps ST35, ST37. Next, since the voice frequency communication apparatus in the side of distant party sends the information depending on the message of FAX, the conditions of step ST39 are established (in this case, the conditions of step ST113 are established in FIG. 10). Therefore, CPU 11 executes the processings of steps ST20 and ST21 through the steps ST12, ST18. Namely the received message is sent to the FAX. Moreover, communication with the voice frequency communication apparatus in the side of distant party is carried out and finally the information corresponding to DCN is received from the voice frequency communication apparatus in the side of distant party (step ST39). After sending DCN to FAX (steps ST13, ST14), CPU 11 instructs the switching control apparatus 12 to switch the second data selector 15 to the side A in the step ST16 through the step ST15. Here, the first data selector 14 may be switched in this timing to the side A.

As described above, the facsimile reception can be conducted using a voice frequency communication apparatus. Moreover, the facsimile transmission can also be conducted but detail explanation is omitted here so as to avoid overlapped explanation. Briefly, in the case of facsimile transmission, TCF and message are sent to the communication line in the steps ST41–ST44. Moreover, in the step ST45, timer watching is conducted corresponding to T2 timer conforming to the CCITT recommendation T.30 and after DCN is sent to the communication line, the first data selector 14 is switched to the side A (steps ST35, ST36).

As explained previously, reliable facsimile communication can be realized.

As described, the present invention brings about the effect that the voice frequency communication apparatus always monitors the sending/receiving data with CPU and thereby communication can be realized certainly with ordinary voice frequency terminal signal and non-voice frequency terminal signal without erroneous changeover of the signal processing path. Moreover, the present invention has removed the transmission branching at the analog signal transmission part and analog switch which have been used in the prior art and thereby provides the effect that attenuation and reflection by signal branching and distortion of analog signal by reflection at the analog switch can be eliminated.

What is claimed is:

1. A voice frequency communication apparatus for converting an original analog signal of voice frequency bandwidth to an original digital signal through a first A/D converter, encoding the original digital signal to a signal of predetermined transmission rate, outputting the encoded original digital signal to a communication line through a communication line I/F circuit, decoding a return digital signal of the predetermined transmission rate input through the communication line I/F circuit from the communication line, converting the decoded return digital signal into a return analog signal and outputting the return analog signal to a transmission line, said apparatus comprising:

a predetermined level D/A converter for converting a branched signal of the original digital signal, generated from said first A/D converter, into a duplicate of the original analog signal, a detection circuit for receiving the duplicate of the original analog signal, for determining whether the duplicate of the original analog signal is a non-voice frequency terminal signal or a voice frequency terminal signal, for generating a voice/non-voice flag dependent on the determination, for converting the duplicate of the original analog signal to a duplicate digital signal, a CPU for receiving the duplicate digital signal from said detection circuit, a data transfer circuit for receiving the duplicate digital signal from said CPU, for selecting one of the encoded original digital signal and the duplicate digital signal from said CPU depending on the generated voice/non-voice flag using a first selector and temporarily storing the selected digital signal, branching means for receiving the return digital signal from said communication line I/F circuit and generating a duplicate of the return digital signal, said detection circuit receiving the duplicate of the return digital signal from said branching means via said data transfer circuit and said CPU and converting the duplicate of the return digital signal into a duplicate return analog signal, an A/D converter for converting the duplicate return analog signal to a duplicate return digital signal, and a changeover control circuit for selecting either the decoded return digital signal or the duplicate return digital signal depending on the generated voice/non-voice flag, said CPU controlling said data transfer circuit and said changeover control circuit to ensure proper two-way communication by said voice frequency communication apparatus.

2. The voice frequency communication apparatus of claim 1, wherein said detection circuit has a bit rate converting function of 9.6 kbps.

3. The voice frequency communication apparatus of claim 2, wherein said detection circuit also has a bit rate converting function of 4.8 kbps.

4. The voice frequency communication apparatus of claim 1, wherein said detection circuit provides a bit rate converting function of 4.8 Kbps and a bit rate converting function of 600 bps, wherein inputs to each of the bit rate converting functions are filtered by a high frequency group band-pass filter means and a low frequency group filter band-pass means.

5. A communication apparatus comprising:

analog signal interface means for receiving and transmitting voice and non-voice analog signals;

predetermined level A/D converter means for converting an original analog signal to an original digital signal;

non-voice input processing means for branching the original digital signal to create a duplicate digital signal, converting the duplicate digital signal to a duplicate analog signal, determining when the duplicate original signal is one of a voice and a non-voice digital signal, generating a voice/non-voice flag dependent upon the determination, and expanding a predetermined data rate of the duplicate analog signal to a data rate of a communication line to produce an expanded duplicate digital signal;

voice input processing means for receiving the original digital signal and encoding the original digital signal to match the data rate of the communication line to produce an encoded original digital signal;

communication line interface means for receiving and transmitting voice and non-voice digital signals;

communication line switching means for reading the generated voice/non-voice flag, selecting one of the encoded original digital signal from said voice input processing means and the expanded duplicate digital signal from said non-voice input processing means, depending on the generated voice/non-voiced flag, and outputting the selected signal to said communication line interface means;

non-voice output processing means for receiving a return digital signal from said communication line interface means and branching the return digital signal to create a duplicate return digital signal, and compressing the data rate of the digital return signal to the predetermined data rate to produce a compressed duplicate return digital signal;

voice output processing means for receiving the return digital signal, and decoding the data rate of the return digital signal to a predetermined data rate to produce a decoded return digital signal;

digital signal switching means for reading the generated voice/non-voice flag, selecting either the decoded return digital signal from said voice output processing means or the compressed duplicate return digital signal from said non-voice output processing means depending on the generated voice/non-voice flag, converting the selected return digital signal to a selected return analog signal, and outputting the selected return analog signal to said analog signal interface means.

6. The communication apparatus of claim 5, wherein said predetermined data rate is 9.6 Kbps.

7. The communication apparatus of claim 6, further comprising a second non-voice input processing means and a second non-voice output processing means, connected parallel to said non-voice input processing means and said non-voice output processing means, respectively, wherein a second predetermined data rate of said second non-voice input processing means and said second non-voice output processing means is 4.8 Kbps.

8. The communication apparatus of claim 5, wherein said predetermined data rate is 4.8 Kbps.

9. The communication apparatus of claim 8, further comprising a second non-voice input processing means and a second non-voice output processing means, connected parallel to said non-voice input processing means and said non-voice output processing means, respectively, wherein a second predetermined data rate of said second non-voice input processing means and said second non-voice output processing means is 0.6 Kbps.

10. The communication apparatus of claim 9, further comprising high frequency group band-pass filtering means operatively connecting an output of said analog signal interface means to an input of said non-voice input processing means and for operatively connecting an output of said non-voice output means to an input of said digital signal switching means, and low frequency group band-pass filtering means operatively connecting the output of said analog signal interface means to an input of said second non-voice input processing means and for operatively connecting an output of said second non-voice output processing means to the input of said digital signal switching means.

11. A data communication system for use in a voice communication system, said voice communication system including, analog signal interface means for receiving and transmitting voice and non-voice analog signals, voice input processing means for digitizing an original analog signal and encoding the original digital signal to match a data rate of a communication line to produce an encoded original digital signal, communication line interface means for receiving and transmitting voice and non-voice digital signals, and voice output processing means for receiving a return digital signal from said communication interface means, and decoding the data rate of the return digital signal to a predetermined data rate to produce a decoded return digital signal, said data communication system comprising:

non-voice input processing means for branching the original digital signal to create a duplicate digital signal, converting the duplicate digital signal to a duplicate analog signal, encoding the duplicate analog signal to produce an encoded duplicate digital signal, determining when the encoded duplicate digital signal is a non-voice digital signal or a voice digital signal, generating a voice/non-voice flag dependent upon the determination, and expanding the data rate of the encoded duplicate digital signal to a data rate of the communication line to produce an expanded encoded duplicate digital signal;

communication line switching means for reading the generated voice/non-voice flag, selecting one of the expanded encoded duplicate digital signal from said non-voice input processing means and the encoded original digital signal from said voice input processing means depending on the generated voice/non-voice flag, and outputting the selected digital signal to said communication line interface means;

non-voice output processing means for receiving a duplicate of the return digital signal from said communication line interface means, and compressing the data rate of the duplicate of the return digital signal to the predetermined data rate to produce a compressed duplicate of the return digital signal; and digital signal switching means for reading the generated voice/non-voice flag, selecting one of the compressed duplicate of the return digital signal from said non-voice output processing means and the decoded return digital signal from said voice output processing means depending on the generated voice/non-voice flag, converting the selected return digital signal to a selected return analog signal and outputting the selected return analog signal to said analog signal interface means.

12. The communication apparatus of claim 11, wherein said predetermined data rate is 9.6 Kbps.

13. The communication apparatus of claim 12, further comprising a second non-voice input processing means and a second non-voice output processing means, connected parallel to said non-voice input processing means and said non-voice output processing means, respectively, wherein a second predetermined data rate of said second non-voice input processing means and said second non-voice output processing means is 4.8 Kbps.

14. The communication apparatus of claim 11, wherein said predetermined data rate is 4.8 Kbps.

15. The communication apparatus of claim 14, further comprising a second non-voice input processing means and a second non-voice output processing means, connected parallel to said non-voice input processing means and said non-voice output processing means, respectively, wherein a second predetermined data rate of said second non-voice input processing means and said second output processing means is 0.6 Kbps.

16. The communication apparatus of claim 14, further comprising high frequency group band-pass filtering means, operatively connecting an output of said analog signal interface means to an input of said non-voice input processing means and for operatively connecting an output of said non-voice output processing means to an input of said digital signal switching means, and low frequency group band-pass filtering means, operatively connecting the output of said analog signal interface means to an input of said second non-voice input processing means and for operatively connecting an output of said second non-voice output processing means to the input of said digital signal switching means.

* * * * *